United States Patent
Wood et al.

(10) Patent No.: US 7,201,572 B2
(45) Date of Patent: Apr. 10, 2007

(54) CERAMIC FIBER COMPOSITE AND METHOD FOR MAKING THE SAME

(75) Inventors: Thomas E. Wood, Stillwater, MN (US); Scott M. Schutts, Menomonie, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/738,447

(22) Filed: Dec. 16, 2003

(65) Prior Publication Data

US 2004/0132607 A1 Jul. 8, 2004

Related U.S. Application Data

(60) Provisional application No. 60/438,662, filed on Jan. 8, 2003.

(51) Int. Cl.
*F23D 14/12* (2006.01)

(52) U.S. Cl. .......................... 431/326; 55/521; 264/109; 428/210; 34/380

(58) Field of Classification Search ................. 431/326, 431/327, 328, 329; 55/521, 523; 264/109, 264/128; 428/210, 219; 34/77, 380, 381, 34/303, 329; 501/95.1

See application file for complete search history.

(56) References Cited

U.S. PATENT DOCUMENTS

| | | | |
|---|---|---|---|
| 3,112,184 A | | 11/1963 | Hollenbach |
| 3,146,197 A | | 8/1964 | Getzin |
| 3,445,252 A | * | 5/1969 | MacDowell |
| 3,458,329 A | | 7/1969 | Owens et al. |
| 3,702,279 A | | 11/1972 | Ardary et al. |

(Continued)

FOREIGN PATENT DOCUMENTS

| | | | |
|---|---|---|---|
| EP | 0 366 028 A2 | * | 5/1990 |
| GB | 1 424 126 | | 2/1976 |
| GB | 1 440 184 | | 6/1976 |
| GB | 1 502 373 | | 3/1978 |
| JP | 57-129307 | * | 8/1982 |
| JP | 05-157214 | * | 6/1993 |
| JP | 11-033413 | * | 2/1999 |
| KR | 8904288 | * | 10/1989 |
| WO | WO 93/25499 | | 12/1993 |
| WO | WO 95/19943 | * | 7/1995 |
| WO | WO 98/33013 | * | 7/1998 |
| WO | WO 99/52838 | * | 10/1999 |
| WO | WO 03/004438 A2 | | 1/2003 |
| WO | WO 03/097213 A1 | * | 11/2003 |

OTHER PUBLICATIONS

Grim et al., "Montmorillonite: High Temperature Reactions and Classifications", The American Mineralogist, 1961, vol. 46, pp. 1329–1369.*

Kublicki, "High Temperature Phases in Montmorillonites", Clays and Clay Minerals, 1958, vol. 566, pp. 144–158.*

Kirk–Othmer Encyclopedia of Chemical Technical, $4^{th}$ Ed., vol. 6, John Wiley & Sons, New York, NY, ©1993, p. 405–423.

ASTM D 737–75 "Air Permeability of Textile Fabrics", Jun. 30, 1975, pp. 115–118.

V.S.R. Murphy et al., "Rheological behavior of borosilicate composites with metallic and non–metallic dispersions", Journal of the European Ceramic Society, vol. 20, No. 11, Oct. 2000, pp. 1717–1728.*

*Primary Examiner*—S. Gravini
(74) *Attorney, Agent, or Firm*—Bradford B. Wright (57) ABSTRACT

A ceramic fiber composite comprises ceramic fibers bonded together by an at least partially ceramic binder formed from a nanoclay and at least one of a ceramic precursor material or a ceramic material. The present invention also concerns methods of forming ceramic fiber composites and burners containing them.

20 Claims, 3 Drawing Sheets

U.S. PATENT DOCUMENTS

| | | | |
|---|---|---|---|
| 3,751,213 A * | 8/1973 | Sowards | 431/328 |
| 3,869,282 A | 3/1975 | Curran et al. | |
| 3,899,555 A | 8/1975 | Takao et al. | |
| 4,073,655 A | 2/1978 | Li | |
| 4,081,371 A | 3/1978 | Yarwood et al. | |
| 4,276,071 A | 6/1981 | Outland | |
| 4,390,355 A | 6/1983 | Hammond, Jr. et al. | |
| 4,421,599 A | 12/1983 | Kuzuoka et al. | |
| 4,608,361 A | 8/1986 | Kanamori et al. | |
| 4,652,286 A | 3/1987 | Kusuda et al. | |
| 4,718,926 A | 1/1988 | Nakamoto et al. | |
| 4,818,729 A * | 4/1989 | Perrotta et al. | |
| 4,828,774 A | 5/1989 | Andersson et al. | |
| 4,968,467 A | 11/1990 | Zievers | |
| 4,977,111 A | 12/1990 | Tong et al. | |
| 5,077,089 A | 12/1991 | Otto | |
| 5,078,818 A | 1/1992 | Han et al. | |
| 5,153,295 A | 10/1992 | Whitmarsh et al. | |
| 5,194,078 A | 3/1993 | Yonemura et al. | |
| 5,194,414 A | 3/1993 | Kuma | |
| 5,223,195 A * | 6/1993 | Kuwabara | |
| 5,260,125 A | 11/1993 | Copes | |
| 5,306,554 A | 4/1994 | Harrison et al. | |
| 5,322,537 A | 6/1994 | Nakamura et al. | |
| 5,369,063 A | 11/1994 | Gee et al. | |
| 5,380,580 A | 1/1995 | Rogers et al. | |
| 5,433,902 A | 7/1995 | Leyderman | |
| 5,476,684 A | 12/1995 | Smith | |
| 5,488,017 A | 1/1996 | Szweda et al. | |
| 5,601,674 A | 2/1997 | Szweda et al. | |
| 5,749,721 A * | 5/1998 | Klinge et al. | 431/328 |
| 5,780,126 A | 7/1998 | Smith et al. | |
| 5,849,375 A | 12/1998 | Smith et al. | |
| 5,955,177 A | 9/1999 | Sanocki et al. | |
| 5,989,013 A * | 11/1999 | Gray | 431/326 |
| 5,993,192 A | 11/1999 | Schmidt et al. | |
| 6,048,195 A * | 4/2000 | Shimek et al. | 431/125 |
| 6,095,800 A * | 8/2000 | Shizukuisha et al. | 431/328 |
| 6,136,476 A * | 10/2000 | Schutts et al. | 429/231.95 |
| 6,190,162 B1 | 2/2001 | Smith et al. | |
| 6,231,639 B1 | 5/2001 | Eichenmiller et al. | |
| 6,287,510 B1 * | 9/2001 | Xun | 264/630 |
| 6,294,125 B1 | 9/2001 | Bridgewater et al. | |
| 6,331,233 B1 | 12/2001 | Turner | |
| 6,397,603 B1 | 6/2002 | Edmondson et al. | |
| 6,444,600 B1 | 9/2002 | Baek et al. | |
| 6,702,650 B2 | 3/2004 | Adefris | |
| 6,913,059 B2 * | 7/2005 | Nixdorf | 156/474 |
| 7,052,532 B1 | 5/2006 | Liu et al. | |
| 2002/0079604 A1 | 6/2002 | Davis et al. | |
| 2002/0086165 A1 | 7/2002 | Davis et al. | |
| 2002/0088214 A1 | 7/2002 | Sherwood | |
| 2002/0088599 A1 | 7/2002 | David et al. | |
| 2002/0117253 A1 | 8/2002 | Hanse | |
| 2003/0165638 A1 | 9/2003 | Louks et al. | |

* cited by examiner

CERAMIC FIBER COMPOSITE AND METHOD FOR MAKING THE SAME

CROSS-REFERENCE TO RELATED APPLICATION

This application claims the benefit of U.S. Provisional Application No. 60/438,662, filed Jan. 8, 2003.

FIELD

The present invention relates to ceramic fiber composite materials.

BACKGROUND

Ceramic materials are useful for many applications including, for example, those in which resistance to high temperatures is required. However, many ceramic materials have a relatively high thermal mass and/or are thermally shock-sensitive.

Gas burners typically operate at high (e.g., combustion) temperatures, and are therefore constructed of materials capable of withstanding such temperatures. Inorganic materials such as ceramics have been used in such burners, at least in part, because of their resistance to high temperatures and combustion.

In some burner designs (e.g., radiant burner or blue flame burner), combustion of gas occurs within or near to a body of ceramic material. Typically, on lighting such burners, the temperature of the ceramic material rapidly rises to the operating temperature of the burner. Variations in the coefficient of thermal expansion (i.e., CTE) that exist within the body of the ceramic material typically lead to an accumulation of stress within the ceramic material as the temperature rises. If sufficiently large, this stress may cause fracture of the inorganic matrix and a resulting failure of the burner.

Current approaches to gas burner manufacture include the use of ceramic and/or metal burner plates and/or radiators. However, such burners may have deficiencies such as, for example, a high pressure drop or high thermal mass that may cause burner inefficiency, unwanted emissions (e.g., $NO_X$ emissions), and/or fragility (e.g., mechanical or thermal shock sensitivity). Thus, there is a continuing need for materials that may be used in gas burners.

SUMMARY

In one aspect, the present invention provides a method of making a ceramic fiber composite comprising:

forming a green substrate from components comprising ceramic fibers, and optionally an organic binder;

impregnating the green substrate with a first impregnation dispersion to provide an impregnated substrate, wherein the first impregnation dispersion comprises water, a nanoclay, and at least one of a ceramic precursor material or a ceramic material;

drying the impregnated substrate to provide a dried substrate;

calcining the dried substrate to form a calcined substrate (in some embodiments, in the form of a paper); and firing the calcined substrate to form a ceramic fiber composite comprising ceramic fibers bonded together by an at least partially ceramic binder, wherein the ceramic fiber composite has a porosity (as determined hereinbelow) of less than 65 percent (e.g., less than 60, 55, 50, 45, 40, 35, 30, 25, 20, or even less than 15 percent).

In another aspect, the present invention provides a ceramic fiber composite comprising ceramic fibers bonded together by an at least partially ceramic binder, wherein the at least partially ceramic binder comprises chemically stabilized β-crystobalite (as described hereinbelow), and wherein the porosity of the ceramic fiber composite is less than 65 percent (e.g., less than 60, 55, 50, 45, 40, 35, 30, 25, 20, or even less than 15 percent). Such ceramic fiber composites may be used, for example, in the manufacture of burners, such as radiant burners and blue flame burners.

Ceramic fiber composites according to some embodiments of the present invention are mechanically stable (i.e., self-supporting, rigid), have relatively low thermal mass (e.g., as compared to metals), and are resistant to thermal shock and cycling. Such ceramic fiber composites are useful as components in the manufacture of gas burners that have one or more of good thermal durability, high efficiency, high thermal output, or low $NO_X$ emissions.

As used herein:

"nanoclay" refers to a clay in the form of extremely fine particles wherein the average primary dimension of the clay particles (i.e., the average largest dimension), is less than 100 nanometers (e.g., less than 50 nanometers);

"drying" refers to removal of greater than 90 percent by weight of the solvents (including water) introduced by the first impregnation dispersion;

"calcining" refers to heating to at least a temperature at which: any remaining volatiles (including all organic materials and water) that were present in a dried substrate are removed, accompanied by the transformation of any ceramic precursor materials that may be present into metal oxide(s); and "firing" refers to heating to at least a temperature at which chemical bonds form between contacting ceramic particles of a calcined substrate, typically resulting in increased strength and density.

DETAILED DESCRIPTION

The green substrate comprises ceramic fibers bonded optionally together by an organic binder material.

Ceramic fibers used in practice of the present invention may be continuous or may have a discrete length (e.g., chopped fibers) and may be, for example, in the form of individual fibers (e.g., straight, crimped, or rovings), yarns, or a fabric (e.g., woven, knitted, or nonwoven). Typically, the ceramic fibers are sufficiently refractory to withstand heating to a temperature of 700° C. for more than 100 hours without significant embrittlement, and/or heating to a temperature of 1200° C. for at least a brief period of time (e.g., 1 minute). The ceramic fibers may contain glassy and/or crystalline phases, and be formed using materials including, for example, metal oxides, metal nitrides, metal carbides, or a combination thereof. For example, the ceramic fibers may primarily or completely comprise fibers formed from metal oxides including, for example, alumina, alumina-silica, alumina-boria-silica, silica, zirconia, zirconia-silica, titania, titania-silica, rare earth oxides, or a combination thereof.

Typically, the ceramic fibers have diameters in a range of from 1 micrometer to 25 micrometers (e.g., from 5 micrometers to 8 micrometers), although fibers with larger or smaller diameters may also be useful. If chopped, the ceramic fibers typically have an average length in a range of from 3 millimeters to 50 millimeters, although longer or shorter fibers may also be useful. Ceramic fibers of different lengths, diameters, and/or compositions may be blended. Typically, the use of longer fibers (e.g., 5 centimeter (cm) or longer) in the green substrate results in high physical integrity of the green substrate.

Exemplary commercially available ceramic fibers include glass fibers, non-oxide fibers (e.g., silicon carbide, silicon oxycarbide, silicon titanium oxycarbide), as well as those fibers marketed by 3M Company (Saint Paul, Minn.) under the trade designation "NEXTEL" (e.g., "NEXTEL 312", "NEXTEL 440", "NEXTEL 550", "NEXTEL 610", "NEXTEL 650", and "NEXTEL 720"), by belChem Fiber Materials GmbH (Freiberg, Germany) under the trade designation "BELCO TEX", and by Hitco Carbon Composites, Inc. (Gardena, Calif.) under the trade designation "REFRASIL".

Optionally, organic fibers may be included in the green substrate. Suitable organic fibers may include, for example, those fibers formed from acrylic, cellulose (e.g., long-length northern softwood fibers and synthetic cellulose), polyester, polyolefin, nylon, polyimide, and combinations thereof. The organic fibers may be fibrillated.

Optionally, the ceramic fibers may be bonded together by an organic binder prior to impregnation with the first impregnation dispersion. This organic binder may be any organic material capable of adhering to the ceramic fibers after drying the green substrate (i.e., it must leave at least some residue on the fibers). The binder may comprise, for example, an organic polymer (e.g., acrylic polymer, styrene-butadiene copolymer, polybutadiene, polyvinyl chloride, acrylonitrile-butadiene copolymer, and polyvinyl acetate) or polymerizable resin (e.g., phenolic resin, thermoplastic, or thermosettable latex), thermoplastic fibers, or a combination thereof. The binder may be dissolved or suspended in a suitable solvent (e.g., water, organic solvent). The organic binder may impart a degree of thermoplastic character to the green substrate, which may be desirable, for example, if the green substrate is to be thermoformed. Typically, after applying the organic binder, the green substrate is at least partially dried and/or cured to remove water and other volatile compounds prior to impregnation with the first impregnation dispersion.

Typically, the organic binder imparts flexibility and handling strength to the green substrate. The organic binder, if used, is typically incorporated into the green substrate and/or dried substrate in an amount in a range of, for example from about 1 percent by weight to about 10 percent by weight, based on the total weight of the green substrate, although other amounts of organic binder may be also be used.

The green substrate may also include lofting agents such as, for example, glass bubbles, cellulosic chips, organic bubbles, and/or bubble agglomerates.

The green substrate may be formed by various techniques including wet-laid and air-laid processes. In one exemplary method, the green substrate may be made using conventional wet-laid paper making processes and equipment. For example, a slurry of ceramic fibers, optional organic binder, and other components in a liquid vehicle (e.g., aqueous or organic solvent) may be prepared using a solution mixer or blender. A coagulating agent (e.g., polyanionic complex, anionic or cationic polymer, ammonium aluminum sulfate, or other metal salt) may be added to the slurry to coagulate the optional organic binder and cause attachment of the organic binder to the ceramic fibers. The slurry is wet-laid onto a fine screen or felt and the liquid vehicle is removed (e.g., by pressing or under reduced pressure), leaving a sheet of entangled fibers and organic binders. The pressed paper may be further dried, if desired prior to impregnating with the first impregnation dispersion. Alternatively, for example, the above-mentioned slurry may be molded or vacuum formed.

In one exemplary air-laid method for forming the green substrate, the ceramic fibers are formed into a nonwoven mat using a conventional web-forming machine such as that marketed under the trade designation "RANDO WEBBER" by Rando Machine Corporation (Macedon, N.Y.). Typically, the nonwoven mat is further entangled by needletacking and/or hydroentanglement using methods well known in the art, although this is not a requirement.

Ceramic fibers in the green substrate may be randomly arranged or at least partially oriented with respect to each other.

The green substrate is then impregnated with a first impregnation dispersion. Exemplary methods of impregnating the green substrate include spraying, saturation coating, and roll coating. Typically, the first impregnation dispersion is applied to (e.g., homogeneously impregnated into) the green substrate, although in some cases it may be desirable for the first impregnation dispersion to be inhomogeneously applied, for example, to only a portion of the green substrate (e.g., applied in the form of a pattern).

The impregnation process may be carried out, for example, at ambient pressure or with an applied or reduced pressure to accelerate penetration of the first impregnation dispersion and to remove all entrained gases from the green substrate. The optional application of reduced pressure may be done while the substrate is being submerged in, or otherwise exposed to, the first impregnation dispersion or afterwards.

Optionally, to aid in impregnating the green substrate with the first impregnation dispersion, a penetrating agent may be included in the first impregnation dispersion. The penetrating agent may be, for example, any of a variety of organic molecules that enhance wetting of the organic binder-containing body of the green substrate by the first impregnation dispersion. The penetrating agent typically facilitates wetting of the organic binder-containing green substrate body by reducing the surface tension of the first impregnation dispersion and by reducing the surface energy at the interface between the first impregnation dispersion and the substrate body. The penetrating agent is typically sufficiently soluble in the first impregnation dispersion as to be present in an amount that enables it to be effective as a penetrating agent during impregnation. The penetrating agent and components of the first impregnation dispersion should be compatible (i.e., does not cause significant flocculation or particle separation).

Examples of useful penetrating agents include alcohols, organic amines, surfactants, and water-soluble polymers and macromolecules.

Exemplary suitable alcohols that may be used as penetrating agents in aqueous impregnation dispersions include alcohols such as isopropyl alcohol, ethyl alcohol, tert-butyl alcohol, butyl alcohol, propyl alcohol, sec-butyl alcohol, and other alcohols having at least moderate solubility in water.

Exemplary suitable organic amines that may be used include nitrate and halide salts of quaternary organic amines having at least one organic moiety attached thereto wherein the moiety comprises a carbon chain greater than two carbons in length.

Exemplary suitable surfactants include nonionic (e.g., sorbitan fatty acid esters, polyoxyethylene sorbitan fatty acid esters, and polyoxyethylene stearates) and anionic surfactants (e.g., dioctyl sodium sulfosuccinate, sodium lauryl sulfate, and sodium dodecylbenzenesulfonate). Commercially available surfactants include: nonionic surfactants, for example, those marketed by Uniqema (Bridgewater, N.J.) under the trade designations "SPAN", "TWEEN", and "MYRJ" and those marketed by BASF Corporation (Mount Olive, N.J.) under the trade designations "PLURONIC" and "TETRONIC"; and anionic surfactants, for example, those marketed by Stepan Company (Winnetka, Ill.) under the trade designation "POLYSTEP" and those marketed by Rhodia, Inc. (Cranbury, N.J.) under the trade designation "ALIPAL".

Water-soluble polymers and macromolecules such as, for example, those possessing hydroxyl groups, carboxylate groups, ethylene oxide or propylene oxide linkages, amido functionality, sulfonate groups, phosphate groups, amino functionality, or water soluble cyclic groups such as pyrroles may also be useful as penetrating agents. The concentration of the penetrating agent typically depends on the nature of the impregnation dispersion and the chosen penetrating agent.

The first impregnation dispersion comprises a dispersion of a nanoclay and at least one of a ceramic precursor material or a ceramic material in a liquid vehicle. The liquid vehicle may be, for example, an aqueous solvent (e.g., water) or an organic solvent.

Nanoclay particles may be, for example, in the form of platelets or flakes. Exemplary nanoclays include bentonite clays, for example, those having a high montmorillonite content. Besides their fine particles size and water dispersibility, montmorillonite clays typically have the capability of being cation exchanged to lower the content of cations such as, for example, sodium and potassium in the montmorillonite clay.

Pyrolysis (e.g., firing) of calcium montmorillonite at or above about 850° C. typically forms a chemically stabilized β-cristobalite that exhibits material properties that contribute to the formation of a durable ceramic fiber composite. Chemically stabilized β-cristobalite also has the added advantage of its material characteristics (e.g., low coefficient of thermal expansion and high thermal shock resistance). The low thermal coefficient of expansion coupled with high temperature stability, makes chemically stabilized β-cristobalite one of the best refractory materials for applications where temperatures less than 1450° C. are encountered.

Chemically stabilized β-cristobalite has basically the same crystal structure as β-cristobalite, a high temperature polymorph of $SiO_2$ (i.e., silica). Chemically stabilized β-cristobalite is formed after the dehydration of the calcium montmorillonite in the firing process. While chemically stabilized β-cristobalite has the β-cristobalite crystal structure, the chemical composition of chemically stabilized β-cristobalite is not that of pure silica. Pure silica is an acidic oxide, while chemically stabilized β-cristobalite is closer in chemistry to a feldspartic mineral and acts as a basic oxide.

β-Cristobalite is a high-temperature, low-pressure polymorph of silica in which the silica tetrahedra are arranged in a diamond like lattice with shared corners. β-Cristobalite has a cubic symmetry while α-cristobalite is tetragonal. In the case of pure silica, the fully expanded, high temperature beta structure undergoes a reversible displacive transformation to a collapsed alpha structure on cooling at about 265° C. This is accompanied by a volume decrease of about 3.2 percent. This transformation is often detrimental to the physical properties of the ceramic material containing the cristobalite. The temperature of the beta to alpha inversion in chemically stabilized or doped cristobalite is variable and depends on the level of doping and the nature of the doping cations. In order to stabilize β-cristobalite down to room temperature, and thereby render the cristobalite desirable as a crystalline component in ceramic materials to be used in refractory applications, the structure is typically doped with a sufficient level of stuffing cations (i.e., chemically stabilized), for example, uniformly dispersed in the crystal structure. Calcium montmorillonite contains the requisite cations (calcium, sodium, and aluminum) necessary to stabilize the β-cristobalite to below room temperature. Thus, by using calcium montmorillonite as a nanoclay binder, highly refractory and durable ceramic fiber composites can be prepared that comprise chemically stabilized β-cristobalite.

If desired, the montmorillonite clay may be combined with glass precursor materials in order to generate a chemically stabilized β-cristobalite glass that is toughened and thermally shock stable. Using various well known techniques, calcium montmorillonite may be ion-exchanged with other cations such as, for example, $Cu^{2+}$, $Co^{2+}$, $Ni^{2+}$, $Fe^{2+}$, $Sr^{2+}$, $K^+$, and $NH_4^+$, etc. to yield, after firing, a variety of stabilized β-cristobalites having different compositions.

Montmorillonite nanoclays are commercially available, for example, under the trade designation "BENTOLITE" (e.g., "BENTOLITE SSP") from Southern Clay Products, Inc. (Gonzales, Tex.).

Ceramic precursor materials are materials that form a high temperature ceramic (e.g., refractory ceramic) upon firing, and include metal hydroxides (e.g., aluminum trihydrate), metal oxy-hydroxides (e.g., boehmite (aluminum oxy-hydroxide), iron oxy-hydroxide), metal salts and metal salt solutions (e.g., solutions of silicates, transition metal salts, rare earth metal salts, aluminum salts, including basic metal salt solutions such as basic aluminum salt solutions and basic zirconium salt solutions) and metal complex solutions such as carboxylates (e.g., calcium oxalate, magnesium oxalate, copper oxalate, rare earth oxalates), phosphates, alkoxides, alcoholates, amine complexes, and hydroxides.

Ceramic particles that may be used in the first impregnation dispersion include powders of metal oxides (silica, alpha alumina, transitional aluminas, boehmite, cordierite, mullite, iron oxide, zirconia, ceria, magnesia, rare earth oxides), aluminates (e.g., barium aluminate, calcium aluminate), aluminosilicates, carbides (e.g., silicon carbide), oxycarbides (e.g., silicon oxycarbide), nitrides (e.g., silicon nitride, titanium nitride, boron nitride), oxynitrides, borides (e.g., titanium boride), and phosphates (e.g., zirconium phosphate, rare earth phosphates), and combinations thereof.

Typically, the ceramic precursor material and/or ceramic particles may be added to the green substrate in amounts of at least about 5 percent (e.g., at least about 10 percent, at least about 20 percent) up to about 30 or even 40 percent, (e.g., up to about 30 percent), based on the combined weight of the ceramic fibers, ceramic precursor material, and ceramic particles in the green substrate and first impregnation dispersion taken together, although other amounts may also be useful.

The nanoclay, ceramic precursor materials and/or ceramic particles may be present in colloidal form (e.g., colloidal silica, colloidal nanoclay, colloidal boehmite) in the first impregnation dispersion.

To incorporate cationic particles such as aluminas and zirconias into the first impregnation dispersion, it may be desirable to convert their surface charge from cationic to anionic. In this way, the nanoclay particles may freely interact (i.e., chemically bond, electrostatically attract or both) with both the ceramic fibers and the oxide particles in the green substrate. Methods of converting normally cationic particles to anionic particles include the following technologies: (1) treating the oxide particles with a polyanionic material such as, for example, polycarboxylic acid functional polymers and their salts, polysulfonated functional polymers and their salts, polyphosphate functional polymers and their salts, polymethacrylic acids and their salts, and the like so that the polyanionic material is adsorbed on the surfaces of the oxide particles, thereby making the oxide particles negatively charged; (2) treating the oxide particles with a polyvalent anionic salt or complexes such as tartrates, citrates or the like so that the anionic salt or complex is absorbed on the surface of the cationic particle, thereby rendering the oxide particle negatively charged; and (3) coating the oxide particle with an oxide colloid or coating that is itself negatively charged. An example of this latter method is the formation of silica-coated oxide particles formed via treatment of the oxide particles with sodium silicate or another hydrolyzable metal complex so as to deposit, by hydrolysis, an oxide coating of the silicate on the surfaces of the oxide particles.

The first impregnation dispersion may optionally further comprise one or more additives, such as a viscosity modifier (e.g., thixotropes, thickeners). Exemplary viscosity modifiers include water-soluble polymers and latexes.

After the green substrate is impregnated with the first impregnation dispersion, it is dried to provide a dried substrate. In some cases, it may be desirable to dry the impregnated green substrate immediately after impregnation. Methods for drying are well known, and include, for example, ovens, microwave heating, convective heating, and infrared heating.

The dried substrate is calcined to form a calcined substrate. Methods for calcining and firing are well known and include, for example, heating in a microwave furnace, box furnace, tube furnace, tunnel kiln, and/or belt kiln.

Typically, calcining is performed by heating the dried substrate at a temperature in a range of from about 350° C. to about 600° C., for a duration of from about 5 minutes to about 12 hours, although other durations and temperatures may also be useful.

Optionally, one or more additional impregnation dispersions (which may be the same as, or different from, the first impregnation dispersion) may be impregnated into at least one of the dried or calcined or fired substrates. Such additional dispersions (e.g., a second dispersion) typically comprise at least one of a ceramic precursor material or a ceramic material, and may optionally further include, for example, a catalyst or a nanoclay.

The calcined substrate is fired to form a ceramic fiber composite according to the present invention. Firing is typically performed by heating the dried substrate at a temperature in a range of from about 800° C. to about 1300° C., for a duration of from about 5 minutes to about 12 hours, although other durations and temperatures may be used. The resultant ceramic fiber composite comprising ceramic fibers is bonded together by an at least partially ceramic binder. By controlling the quantity of organic components and/or the density of the green substrate, it is possible to control the porosity of the ceramic fiber composite.

In some embodiments according to the present invention, calcining and firing may be carried out in a single process step.

Ceramic fiber composites according to the present invention have a porosity (exclusive of any perforations) of less that 65 percent (e.g., less than 60, less than 55, less than 50, less than 45, less than 40, less than 35, less than 30, less than 25, less than 20, or even less than 15 percent), and may have a porosity of greater than 10 percent (e.g., greater than 15, greater than 20, greater than 25, greater than 30, greater than 35, greater than 40, greater than 45, greater than 50, greater than 55, or even greater than 60 percent), based on the total volume of the ceramic fiber composite. Porosity in the ceramic fiber composite may be created, for example, by using a ceramic fiber fabric or mat having an open weave, or by forming a precursor substrate (e.g., the green substrate, dried substrate, or calcined substrate) to have a plurality of orifices in that substrate in a random, regular, or periodic fashion.

As used herein, "porosity" (in percent) is determined at 22° C. for a given ceramic fiber composite by dividing its pore volume by the total volume of the ceramic fiber composite (i.e., the pore volume plus the volume of the solid phase of the ceramic fiber composite) and multiplying by 100.

The pore volume of ceramic fiber composites can be determined by weighing a dry sample of ceramic fiber composite, saturating it with water, and weighing the saturated ceramic fiber composite. The pore volume equals the weight of the water in the saturated ceramic fiber composite divided by density of water.

The volume of the solid phase of a ceramic fiber composite can be determined by the Archimedes method, wherein the ceramic fiber composite (in dry form) is weighed, then immersed in a quantity of water and weighed while immersed. The difference between the dried and immersed weight of the sample is equal to the weight of the water that is displaced by the sample. The weight of the displaced water is converted to the volume of displaced water (which equals the volume of the solid phase) by dividing weight of the displaced water by the density of water.

In the special case of regularly shaped materials, a simple geometric calculation may be used to determine the volume of the solid phase. First, the dimensions of the ceramic fiber composite are measured (e.g., using a micrometer) and the volume of the material is calculated by applying the formula appropriate for the geometric form (e.g., in the case of a rectangular prism, the volume equals the width times the length times the height). The volume of the solid phase equals the calculate volume of the ceramic fiber composite minus the pore volume (as determined above).

Typically, the volume of the ceramic fibers is in a range of from at least 10 percent (e.g., at least 15, 20, or even at least 25 percent) up to 50 percent (e.g., up to 25, 30, 35, 40, or 45 percent) of the total volume of the at least partially ceramic binder and ceramic fibers, although higher and lower percentages may also be useful.

The ceramic fiber composite (e.g., for use as a burner pad) may be made to be thin (e.g., less than 1 millimeter in thickness) or thick (e.g., greater than 0.5 centimeter in thickness), although other thickness may also be useful. The thickness may be controlled, for example, by varying the thickness of the green substrate. Thin ceramic fiber composites may be accomplished by using a dense, pressed nonwoven mat or paper as a green substrate, whereas thicker ceramic fiber composites may be prepared, for example, by using a thicker, optionally lofted or needletacked, nonwoven green substrate.

The at least partially ceramic binder of ceramic fiber composites according to the present invention may be distributed at least substantially uniformly throughout the ceramic fiber composite or may have regions of higher and lower concentration.

Ceramic fiber composites according to the present invention may be used to support a number of different kinds of catalysts to assist in the reduction of other pollutants (e.g., $NO_X$) in the combustion device exhaust. One way to catalyze a ceramic fiber composite according to the present invention is to introduce catalyst precursors, catalytic materials, or a combination thereof at one or more points in the substrate manufacturing process. Such catalytic components may be introduced in the initial green substrate forming process, in one or more impregnation steps, or a combination thereof. Exemplary catalytic materials include materials comprising metals such as platinum, palladium, rhodium, iron, nickel, silver, ruthenium, copper, gold, and combinations and alloys of these metals and compounds of these metals and metal oxides such as iron oxide, copper oxide, alkaline earth oxides, and alkaline earth aluminates, rare earth oxides, rare earth aluminates, cerium oxide, vanadium oxide, manganese oxide, cobalt oxide, first row transition metal—rare earth oxide compounds and mixtures, oxides having perovskite and perovskite-related crystal structures, metal phosphates and phosphate-oxide mixtures, and $NO_X$ reduction catalysts (e.g., rhodium supported on alumina, ceria, or alumina-ceria). The catalyst(s) may be present as particles of catalyst material(s) or catalyst material(s) on support particles, where the particles are adsorbed on the surface of the ceramic fiber composite.

In one embodiment according to the present invention, the catalytic metal or metal compound may be applied to the green substrate as a metal salt solution. The metal salt may then be, for example, chemically altered (e.g., chemically reduced) to the active metal form, or thermally decomposed to the active metal form, and adsorbed onto the ceramic fibers and ceramic component material. The catalytic metal or metal compound may also be formed as a colloidal dispersion or adsorbed on a colloidal carrier and then applied to the ceramic fibers and ceramic component material by dipping or other impregnation techniques. Catalytic metals or metal compounds may also be applied by conventional gas phase deposition techniques.

Ceramic fiber composites according to the present invention may have any shape (e.g., a sheet that may be substantially planar or nonplanar, a cone, a cylinder, or a thimble), the choice typically depending on the intended application. Exemplary methods of shaping the ceramic fiber composite include, for example, molding, embossing, and cutting the green substrate to a form that is maintained through the various processes described hereinabove to give a shaped ceramic fiber composite.

Alternatively, or in addition, ceramic fiber composites according to the present invention may be perforated, for example, by a laser, die, and/or hydrojet. The perforations may comprise at least one of slits (e.g., elongated openings) or circular holes and may comprise less than 40 percent (e.g., less than 35, 30, 25, 20, or even less than 15 percent) of the surface area of the ceramic fiber composite. Perforation may be performed on one or more of the green substrate, dried substrate, calcined substrate, and/or the ceramic fiber composite.

Ceramic fiber composites according to the present invention may be used, for example, in the manufacture of various burners. In such use, it may be desirable to arrange perforations in the ceramic fiber composite such that they are located away from (e.g., at least 1 or 2 centimeters) away from contact points with any housing to which they are mounted. This may help to reduce heating of the housing during operation of the burner.

Figure 1:
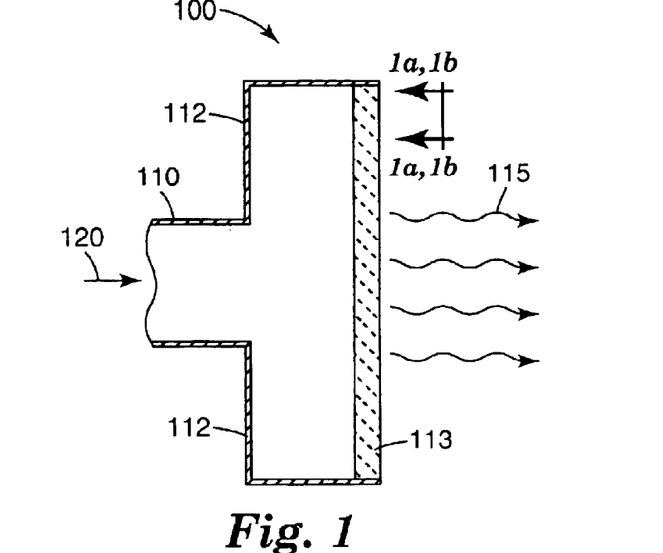
FIG. 1 is a cross-sectional schematic view of an exemplary burner according to one embodiment of the present invention.
Figure 1A:
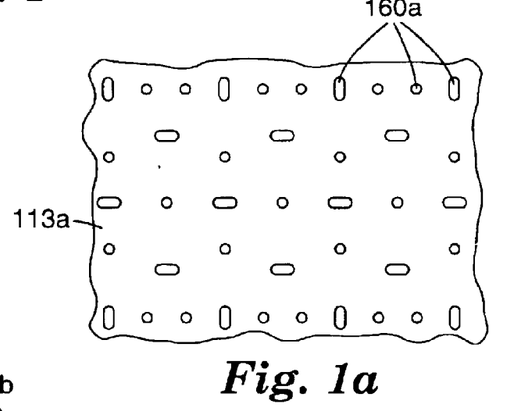
FIG. 1a is a detailed view of one exemplary embodiment of FIG. 1.
Figure 1B:
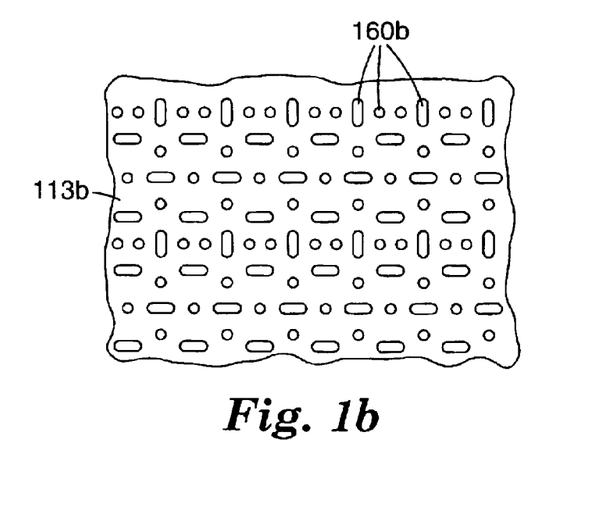
FIG. 1b is a detailed view of one exemplary embodiment of FIG. 1.

In some embodiments, ceramic fiber composites according to the present invention may be used as a burner plate in a radiant or blue-flame burner. Referring to FIG. 1, burner 100 comprises housing 112 having gas inlet port 110. Burner plate 113 (shown in FIGS. 1a and 1b as 113a and 113b, respectively), which comprises a ceramic fiber composite according to the present invention, and optionally having holes 160a, 160b therein (as shown in FIGS. 1a and 1b, respectively), contacts housing 112 to form a seal that prevents gas from escaping around burner plate 113. In operation, a premixed gaseous fuel-air mixture 120 is introduced into burner 100 through gas inlet port 110. By adjusting the gas flow rate, combustion may be stabilized inside burner plate 113, which in turn heats up and radiates thermal energy 115. Typically, burner plate 113 should be sufficiently permeable to gaseous fuel-air mixture 120 (e.g., by being sufficiently porous and/or perforated) that it does not develop undesirably high back-pressure during use. By increasing the pressure drop across burner plate 113, it is typically possible to cause combustion to occur (e.g., with a visible blue flame) on the external face of burner plate 113. Burners that operate under such conditions are commonly termed blue-flame burners.

Exemplary perforated porous ceramic fiber composites according to the present invention that are suitable for use in burners are shown in FIGS. 1a (radiant burner) and 1b (blue-flame burner).

Further details concerning porous radiant burner design and operation may be found, for example, in U.S. Pat. No. 4,977,111 (Tong et al.); U.S. Pat. No. 5,077,089 (Otto); U.S. Pat. No. 5,993,192 (Schmidt et al.); and U.S. Pat. No. 6,190,162 B1 (Smith et al.), the disclosures of which are incorporated herein by reference.

Besides functioning as burner components, some embodiments of ceramic fiber composites according to the present invention may also find application in the areas of gas and fluid filtration, and/or thermal insulation (e.g., automotive or engine insulation).

The present invention will be more fully understood with reference to the following non-limiting examples in which all parts, percentages, ratios, and so forth, are by weight unless otherwise indicated.

EXAMPLES

Unless otherwise noted, all reagents used in the examples were obtained, or are available, from general chemical suppliers such as Aldrich Chemical Company, Milwaukee, Wis., or may be synthesized by known methods.

The following terms and abbreviations are used in the examples that follow:

| | |
|---|---|
| NC1 | a calcium montmorillonite nanoclay obtained under the trade designation "BENTOLITE SSP" from Southern Clay Products |
| CPM1 | silicon carbide particles having an average particle size of 4 micrometers obtained under the trade designation "1200-W BLACK SiC" from Electro Abrasives Corporation (Buffalo, New York) |
| CPM2 | silicon carbide particles having an average particle size of 9 micrometers obtained under the trade designation "800-W BLACK SiC" from Electro Abrasives Corporation (Buffalo, New York) |
| LTX1 | acrylic polymer latex obtained under the trade designation "RHOPLEX AC-261" from Rohm and Haas Company (Philadelphia, Pennsylvania) |
| SURF1 | ~70 percent by weight solution of dioctyl sodium sulfosuccinate in petroleum distillates obtained under the trade designation "AEROSOL OT-S" from Cytec Industries, Inc. (Charlotte, North Carolina) |

Porosities reported in the following examples were determined according to the Archimedes method unless otherwise specified.

General Procedure for Making a Ceramic Fiber Composite

The indicated impregnation dispersion was applied to a piece of a ceramic paper (6 inches×6 inches×⅛ inch (15 cm×15 cm×0.32 cm)) composed of ½-inch (1.2 cm) aluminum borosilicate fibers obtained under the trade designation "3M NEXTEL 312" from 3M Company, and having a basis weight of 150 grams per square meter (g/m²). The ceramic paper was prepared according to the "Wet Lay Method II" procedure of U.S. Pat. No. 5,955,177 (Sanocki et al.), the disclosure of which is incorporated herein by reference. The ceramic paper was saturated with the indicated impregnation dispersion resulting in a corresponding impregnated ceramic paper.

The impregnated ceramic paper was dried immediately after preparation on a perforated steel plate in a forced air furnace (obtained under the trade designation "DESPATCH V SERIES" from Despatch Industries (Minneapolis, Minn.) for 30 minutes at 65° C. to yield a corresponding dried coated paper.

The dried coated paper was then calcined and fired in a box oven (obtained under the trade designation "BOX OVEN" from Lindberg/Blue M (Ashville, N.C.) with heating according to the following temperature profile: room temperature to 250° C. at 2 degrees per minute, hold at 250° C. for 1 hour, ramp at 2 degrees per minute to 450° C., hold at 450° C. for 1 hour, ramp at 2 degrees per minute to 850° C., hold at 850° C. for 1 hour. After cooling to room temperature a corresponding ceramic fiber composite was obtained.

General Procedure for Perforating a Ceramic Fiber Composite

The indicated ceramic fiber composite was perforated by hand using a pin for the holes and tweezers for the slits to produce different designs for evaluation as a burner material in both blue flame and radiant mode.

Strength and Stiffness Test

Strength and stiffness of the ceramic fiber composites were measured using a materials tester obtained under the trade designation "MTS SINTECH 10D" from SINTECH, a division of MTS Systems Corporation (Eden Prairie, Minn.).

The test specimen 2 inches×2 inches (5 cm×5 cm) of ceramic fiber composite to be tested was mounted between two metal plates, each having a 2.85 cm hole, in a rig attached to the tester. The rig with plates was immobilized and a 2.85 mm diameter, flat-tipped rod was brought into contact with the specimen at the center of the hole. The test was run at a crosshead speed of 1 mm/minute, and the force required to punch the rod through the ceramic fiber composites was recorded using a 25 N capacity load cell. The Peak load was determined as the highest load in the load-displacement curve and recorded in grams. Stiffness was measured as the slope of the linear portion of the initial rise in the load-displacement curve and was recorded in Newtons/millimeter (N/mm).

Thermal Cracking Test

Ceramic fiber composites were tested by thermally shocking the specimens using a propane torch (obtained under the trade designation "TS2000" from BernzOmatic (Medina, N.Y.). The test specimen 2 inches×2 inches (5 cm×5 cm) of ceramic fiber composite to be tested was hung from a paper clip at room temperature, and the center of the specimen was exposed to the flame of the propane torch at a distance of 1.3 cm for 1 minute. The specimens were visually examined for cracks after the thermal shock. Results were recorded as either cracked or not cracked.

Burner Evaluation Test

A specimen of ceramic fiber composite (6 inches×6 inches (15 cm×15 cm) pieces) to be tested was mounted into the burner housing of a test burner obtained under the trade designation "PREMIX TEST FIRE STATION" obtained from Heatco, Inc. (Acworth, Ga.). The burner was lit, and the gas and air flows were adjusted in an attempt to produce uniform flame retention in radiant and blue-flame modes. The "turn down ratio" (i.e., the difference between the highest gas/air flow rate and the lowest gas/air flow rate at which the burner operates without flame-out) was determined by ascertaining the maximum and minimum stable flame conditions that could be obtained by modulating the gas/air flow rate.

Preparation of Impregnation Dispersion 1

A large beaker was charged with 3400 g of deionized water. While the water was being rapidly stirred with a magnetic stir bar, 600 g of NC1 was added, and the mixture was rapidly stirred for 3 hours resulting in a smooth (free of large particles) dispersion (Dispersion A). In a small beaker, 40 g of Dispersion A was mixed with 31.5 g of deionized water with a magnetic stir bar for 10 minutes. While still mixing, 21.5 g of ceramic precursor material CPM1 was added followed by the addition of 7.0 g of LTX1. The mixture was blended well using a high shear mixer obtained under the trade designation "OMNI 5000 MIXER" from Omni International, Inc. (Warrenton, Va.). Next, 2 drops of SURF1 was added and mixing was continued (at a slower stirring rate to minimize the formation of bubbles) for 3 hours, resulting in Impregnation Dispersion 1.

Example 1

Two ceramic papers (15 cm×15 cm) were impregnated with Impregnation Dispersion 1, dried, calcined and fired according to the General Procedure for Making a Ceramic Fiber Composite (above) resulting in ceramic fiber composite CFC1 having an a porosity of 61.6 percent. The resulting ceramic fiber composites were perforated in different patterns according to the General Procedure for Perforating a Ceramic Fiber Composite (above) resulting in ceramic fiber composites CFC1a and CFC1b.

Figure 2:
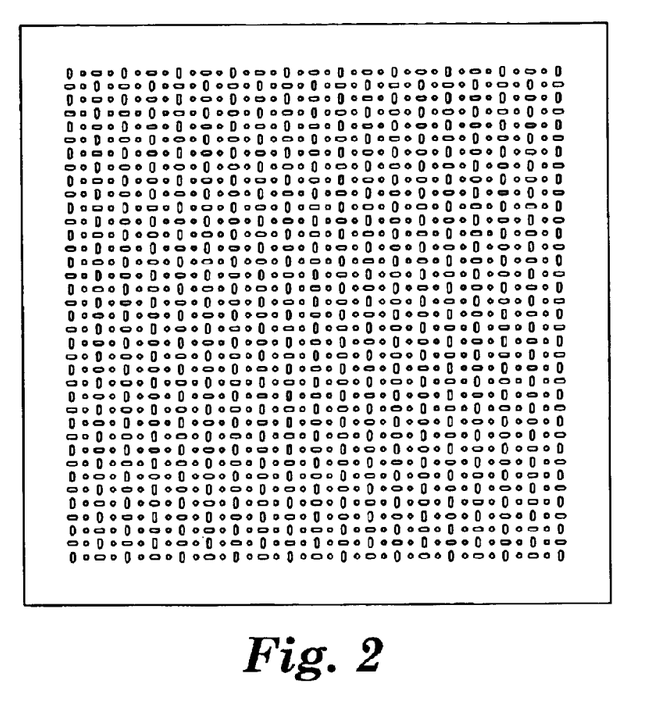
FIG. 2 is a template pattern used to perforate the ceramic fiber composite shown in FIG. 3.
Figure 3:
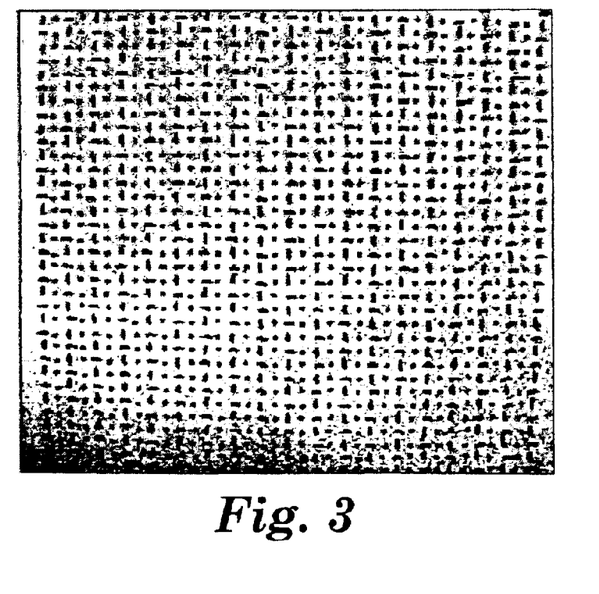
FIG. 3 is a photomicrograph of an exemplary ceramic fiber composite according to the present invention.

Ceramic fiber composite CFC1a was perforated using a template having perforations according to the 6-inch by 6-inch square pattern shown in FIG. 2. A portion of ceramic fiber composite CFC1a is shown in FIG. 3.

Figure 4:
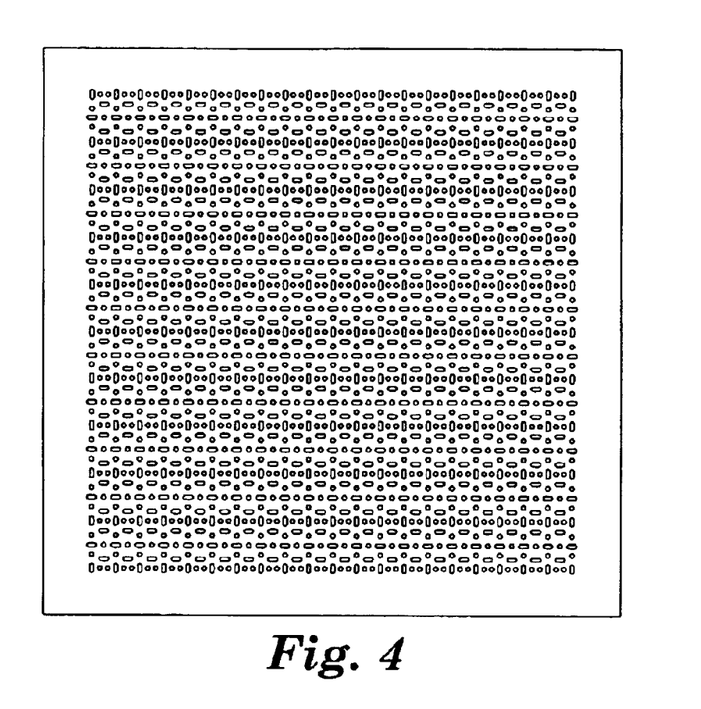
FIG. 4 is a template pattern used to perforate the ceramic fiber composite shown in FIG. 5.
Figure 5:
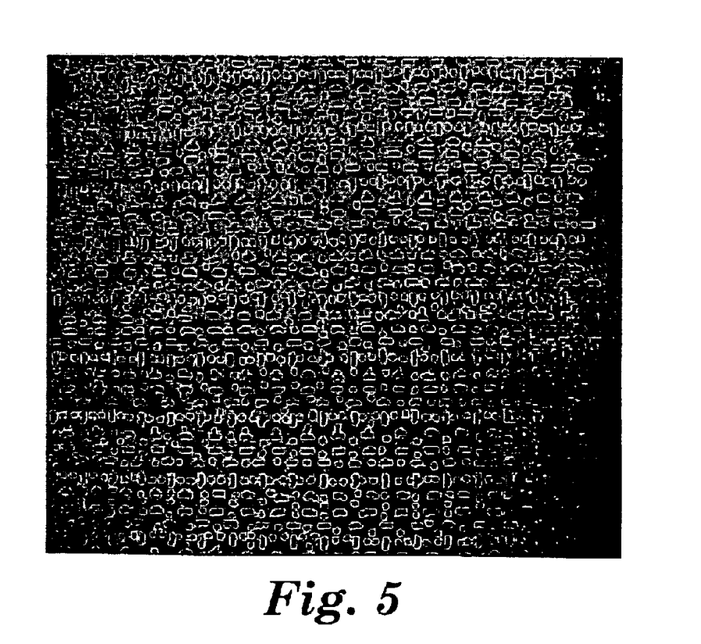
FIG. 5 is a photomicrograph of an exemplary ceramic fiber composite according to the present invention.

Ceramic fiber composite CFC1a was perforated using a template having perforations according to the 6-inch by 6-inch square pattern shown in FIG. 4. A portion of ceramic fiber composite CFC1a is shown in FIG. 5.

Ceramic fiber composites CFC1a and CFC1b were evaluated according to the Burner Evaluation Test.

In blue-flame mode, ceramic fiber composite CFC1a exhibited adequate flame retention without flash back, but had a low turn down ratio.

In blue-flame mode, ceramic fiber composite CFC1b exhibited very stable flame retention without flash back, and had a high turn down ratio.

Example 2

A ceramic fiber composite was prepared as described for ceramic fiber composite CFC1a in Example 1. A catalyst was applied to a portion (roughly half) of the ceramic fiber composite CFC1a as follows:

A ceria-zirconia ceramic oxidation catalyst was prepared in the following manner: a mixed sol was prepared by adding with rapid stirring 100.0 g of a 20 percent by weight acetate stabilized aqueous colloidal ceria obtained under the trade designation "CeO$_2$ACT" from Nyacol Corporation (Ashland, Mass.) to a mixture of 65.0 g of a 22 percent by weight aqueous zirconia sol (obtained under the trade designation "ZIRCONIUM ACETATE" from Magnesium Elektron, Inc. (Flemington, N.J.)), and 100 mL of deionized water. The resulting mixed sol was added dropwise with rapid stirring to a solution of 35 mL of concentrated ammonium hydroxide in 450 mL of deionized water. After the addition, the resulting gel was separated by centrifugation (at 5000 rpm for 15 minutes) and dried. The dried gel was slowly heated in an oven for 4 hours from room temperature to a final temperature of 800° C. at which it was then calcined and fired for 1 hour longer to form a ceramic oxidation catalyst. The fired ceramic oxidation catalyst was cooled to room temperature, then pulverized using a mortar and pestle. The pulverized ceramic oxidation catalyst was ball-milled along with one liter of deionized water and 1 mL of concentrated ammonium hydroxide using a 2-liter rubber-lined mill jar charged with about 4600 g of 1.27 cm zirconia mill media obtained from US Stoneware (East Palestine, Ohio). Milling was continued for 48 hours to form a uniform and smooth ceria-zirconia dispersion.

A portion (30 mL) of the ceria-zirconia dispersion was added dropwise onto the surface of the ceramic fiber composite (CFC2) prepared above. This coated ceramic fiber composite was dried in the oven at 95° C. for 1 hour resulting in a ceria-zirconia treated ceramic fiber composite (CFC3).

A chloroplatinic acid solution was prepared by diluting 1 mL of a 10 percent by weight aqueous solution of chloroplatinic acid with 9 mL of water. The ceria-zirconia treated ceramic fiber composite (CFC3) was then treated with this solution by adding the chloroplatinic acid solution dropwise onto the surface of the ceramic fiber composite to form a uniformly treated surface. This treated ceramic fiber composite was then heated at 400° C. for 1 hour resulting in catalyst treated ceramic fiber composite (CFC4).

Ceramic fiber composite (CFC4) was subjected to the Burner Evaluation Test and evaluated in the blue flame mode (as set for the uncatalyzed portion of the ceramic fiber composite). There was no evidence of flash back, and flame retention was very stable and flame height was uniform. It was observed that modulation between low and high firing intensities was excellent. The catalyzed portion of the ceramic fiber composite burned in the radiant mode while the un-catalyzed portion burned in a blue flame mode.

Example 3

Impregnation Dispersion 2 was prepared according to the preparation of Impregnation Dispersion 1, except that the 31.5 g quantity of deionized water was replaced by a 21.5 g quantity of deionized water.

The procedure of Example 1 was repeated, except that Impregnation Dispersion 1 was replaced by Impregnation Dispersion 2 (above), and except that the ceramic paper used was substituted by a 5 cm×5 cm×3.5 cm sheet with a basis weight of 206 g/m$^2$. The porosity of the resultant ceramic fiber composite (CFC5) was determined as follows: a 2.8 cm×4.1 cm and a 3.5 cm×2.0 cm section of the ceramic fiber composite to be tested were cut from the parent sample using a razor blade. The dimensions of each piece were measured using an electronic digital caliper obtained under the trade designation "FOWLER & NSK MAXI-CAL" (Fred V. Fowler Co., Inc., Des Plaines, Ill.). The porosities of the pieces were measured using the geometric method to determine the volume of each specimen. The average porosity of the two specimens taken together was found to be 50.1 percent.

Examples 4–27 and Comparative Examples A–E

Preparation of Impregnation Dispersions for Examples 4–27 and Comparative Examples A–E:

A large beaker was charged with 3400 g of deionized water. While the water was being rapidly stirred with a magnetic stir bar, 600 g of NC1 was added and the mixture was mixed for 3 hours resulting in a smooth (free of large particles) dispersion. In a small beaker, a quantity of this dispersion was mixed with water (in amounts as indicated in Table 1 (below)) with a magnetic stir bar for 10 minutes. While mixing, a quantity of silicon carbide was added followed by the addition of a quantity of LTX1 (in amounts as indicated in Table 1 (below)). After mixing well, 2 drops of SURF1 was added and the final sol was mixed for 3 hours but more slowly to avoid the formation of bubbles after the addition of the SURF1 to yield the Impregnation Dispersion.

While still mixing, a quantity of silicon carbide was added followed by the addition of a quantity of LTX1 (in amounts as indicated in Table 1 (below)). The mixture was blended well using a high shear mixer (obtained under the trade designation "OMNI 5000 MIXER" from Omni International, Inc.). Next, 2 drops of SURF1 was added and mixing was continued (at a slower stirring rate to minimize the formation of bubbles) for 3 hours, resulting in the indicated Impregnation Dispersion.

The resulting Impregnation Dispersions were substituted for Impregnation Dispersion 1 and the procedure of Example 1 was repeated, except that the ceramic paper dimensions were 2 inches×2 inches×⅛ inch (5 cm×5 cm×0.14 cm).

The resultant ceramic fiber composites were evaluated to the Strength and Stiffness Test and Thermal Cracking Test. Results are reported in Table 1 (below).

TABLE 1

| Example | Type of SiC | SiC, g | LTX1, g | NC1, g | Deionized Water, g | Peak Load, g | Stiffness, N/mm | Porosity, percent |
|---|---|---|---|---|---|---|---|---|
| Example 4 | CPM2 | 5 | 4 | 78.4 | 12.6 | 529 | 11.7 | 60.0 |
| Example 5 | CPM2 | 5 | 7 | 78.4 | 9.6 | 711 | 29.9 | 58.5 |
| Example 6 | CPM2 | 5 | 10 | 78.4 | 6.6 | 840 | 28.2 | 57.0 |
| Comparative Example A | CPM2 | 10 | 4 | 54.9 | 31.1 | 1198 | 45.0 | 68.0 |
| Example 7 | CPM2 | 10 | 4 | 78.4 | 7.6 | 577 | 19.1 | 60.5 |
| Comparative Example B | CPM2 | 10 | 7 | 54.9 | 28.1 | 1053 | 40.6 | 73.7 |
| Example 8 | CPM2 | 10 | 7 | 78.4 | 4.6 | 732 | 30.4 | 50.0 |
| Comparative Example C | CPM2 | 10 | 10 | 54.9 | 25.1 | 963 | 31.2 | 67.5 |
| Example 9 | CPM2 | 10 | 10 | 78.4 | 1.6 | 413 | 6.3 | 54.4 |
| Example 10 | CPM2 | 20 | 4 | 54.9 | 21.1 | 1957 | 46.0 | 62.8 |
| Example 11 | CPM2 | 20 | 7 | 54.9 | 18.1 | 2003 | 39.2 | 60.5 |
| Example 12 | CPM2 | 20 | 10 | 54.9 | 15.1 | 2129 | 43.8 | 63.0 |
| Example 13 | CPM1 | 5 | 4 | 78.4 | 12.6 | 893 | 35.0 | 52.0 |
| Example 14 | CPM1 | 5 | 7 | 78.4 | 9.6 | 828 | 37.6 | 49.5 |
| Example 15 | CPM1 | 5 | 10 | 78.4 | 6.6 | 958 | 33.9 | 45.7 |
| Example 16 | CPM1 | 10 | 4 | 54.9 | 31.1 | 1145 | 46.3 | 59.0 |
| Example 17 | CPM1 | 10 | 4 | 78.4 | 7.6 | 904 | 32.5 | 47.2 |
| Example 18 | CPM1 | 10 | 7 | 31.4 | 51.6 | 443 | 17.0 | 61.6 |
| Comparative Example D | CPM1 | 10 | 10 | 31.4 | 48.6 | 437 | 16.8 | 76.4 |
| Example 19 | CPM1 | 10 | 10 | 54.9 | 25.1 | 759 | 36.0 | 60.3 |
| Example 20 | CPM1 | 10 | 10 | 78.4 | 1.6 | 773 | 28.4 | 46.9 |
| Example 21 | CPM1 | 20 | 4 | 54.9 | 21.1 | 2339 | 53.4 | 58.6 |
| Comparative Example E | CPM1 | 20 | 10 | 31.4 | 38.6 | 1614 | 43.7 | 69.7 |
| Example 22 | CPM1 | 20 | 10 | 54.9 | 15.1 | 2223 | 48.4 | 52.8 |
| Example 23 | CPM1 | 25 | 7 | 50 | 18 | 1480 | 28.2 | 51.5 |
| Example 24 | CPM1 | 18 | 7 | 50 | 25 | 1266 | 32.1 | 62.4 |
| Example 25 | CPM1 | 19.85 | 7 | 45 | 28.3 | 1266 | 35.7 | 58.4 |
| Example 26 | CPM1 | 21.5 | 7 | 40 | 31.5 | 1331 | 41.8 | 61.6 |
| Example 27 | CPM1 | 23.3 | 7 | 45 | 24.8 | 1560 | 34.4 | 59.2 |

Duplicates of each of Examples 4–27 and Comparative Examples A–E were tested for thermal cracking.

In the Thermal Cracking Test: Example 18 and Examples 23–27 exhibited no cracking; Examples 4, 6, 8, 9, 11, 15, and 17 and Comparative Example B, all had one specimen out of two crack; and the remaining Examples and Comparative Examples had both specimens crack. While examples in which specimens cracked may or may not be useful for burner applications, they may be useful in other application (e.g., filter media, insulation).

Example 33

A 15 cm×15 cm piece of ceramic fiber composite CFC1 was prepared according to the procedure of Example 1. The porosity of this piece was measured as follows: nine 3 cm×3 cm sections of ceramic fiber composite CFC1 were cut from the parent sample using a razor blade. The dimensions of each section were measured using an electronic digital caliper obtained under the trade designation "FOWLER & NSK MAXI-CAL" (Fred V. Fowler Co., Inc., Des Plaines, Ill.). The porosities of the sections were measured using the geometric method to determine the volume of each section. The average porosity of the two sections taken together was 61.1 percent.

Various modifications and alterations of this invention will become apparent to those skilled in the art without departing from the scope and spirit of this invention, and it should be understood that this invention is not to be unduly limited to the illustrated embodiments set forth herein.

What is claimed is:

1. A method of making a ceramic fiber composite comprising:
   forming a green substrate from components comprising ceramic fibers;
   impregnating the green substrate with a first impregnation dispersion to provide an impregnated substrate, wherein the first impregnation dispersion comprises water, a nanoclay, and at least one of a ceramic precursor material or a ceramic material;
   drying the impregnated substrate to provide a dried substrate;
   calcining the dried substrate to form a calcined substrate; and
   firing the calcined substrate to form a ceramic fiber composite comprising ceramic fibers bonded together by an at least partially ceramic binder, wherein the ceramic fiber composite has a porosity of less than 65 percent.

2. A method according to claim 1, wherein the green substrate is formed from components comprising ceramic fibers and an organic binder material.

3. A method according to claim 1, wherein the at least partially ceramic binder comprises chemically stabilized β-crystobalite.

4. A method according to claim 1, wherein the chemically stabilized β-crystobalite comprises calcium.

5. A method according to claim 1, further comprising impregnating a second dispersion into at least one of the dried, calcined, or fired substrates, wherein the second dispersion comprises at least one of a ceramic precursor material or a ceramic material.

6. A method according to claim 5, wherein the second dispersion further comprises at least one of a catalyst or a nanoclay.

7. A method according to claim 1, further comprising perforating the dried substrate.

8. A method according to claim 1, further comprising perforating the ceramic fiber composite.

9. A method according to claim 1, wherein the ceramic particles comprise an oxide of at least one of aluminum, zirconium, or silicon.

10. A method according to claim 1, wherein the first impregnation dispersion further comprises a surfactant.

11. A method according to claim 10, wherein the surfactant is ionic.

12. A method according to claim 1, wherein the first impregnation dispersion further comprises a viscosity modifier.

13. A method according to claim 1, wherein the porosity of the ceramic fiber composite is less than 60 percent.

14. A method according to claim 1, wherein the porosity of the ceramic fiber composite is less than 40 percent.

15. A method according to claim 1, wherein the porosity of the ceramic fiber composite is less than 20 percent.

16. A method according to claim 1, further comprising at least one of molding or shaping the green substrate.

17. A method according to claim 1, wherein the first impregnation dispersion comprises at least one of a metal oxide or a metal oxide precursor.

18. A method according to claim 17, wherein at least one the metal oxide or the metal oxide precursor is colloidal.

19. A method according to claim 1, wherein the first impregnation dispersion comprises silicon carbide.

20. A method according to claim 19, wherein the first impregnation dispersion further comprises at least one of colloidal boehmite, colloidal zirconia, or colloidal silica.

* * * * *